July 9, 1929.  E. R. BURTNETT  1,720,262
ENGINE
Filed June 18, 1925
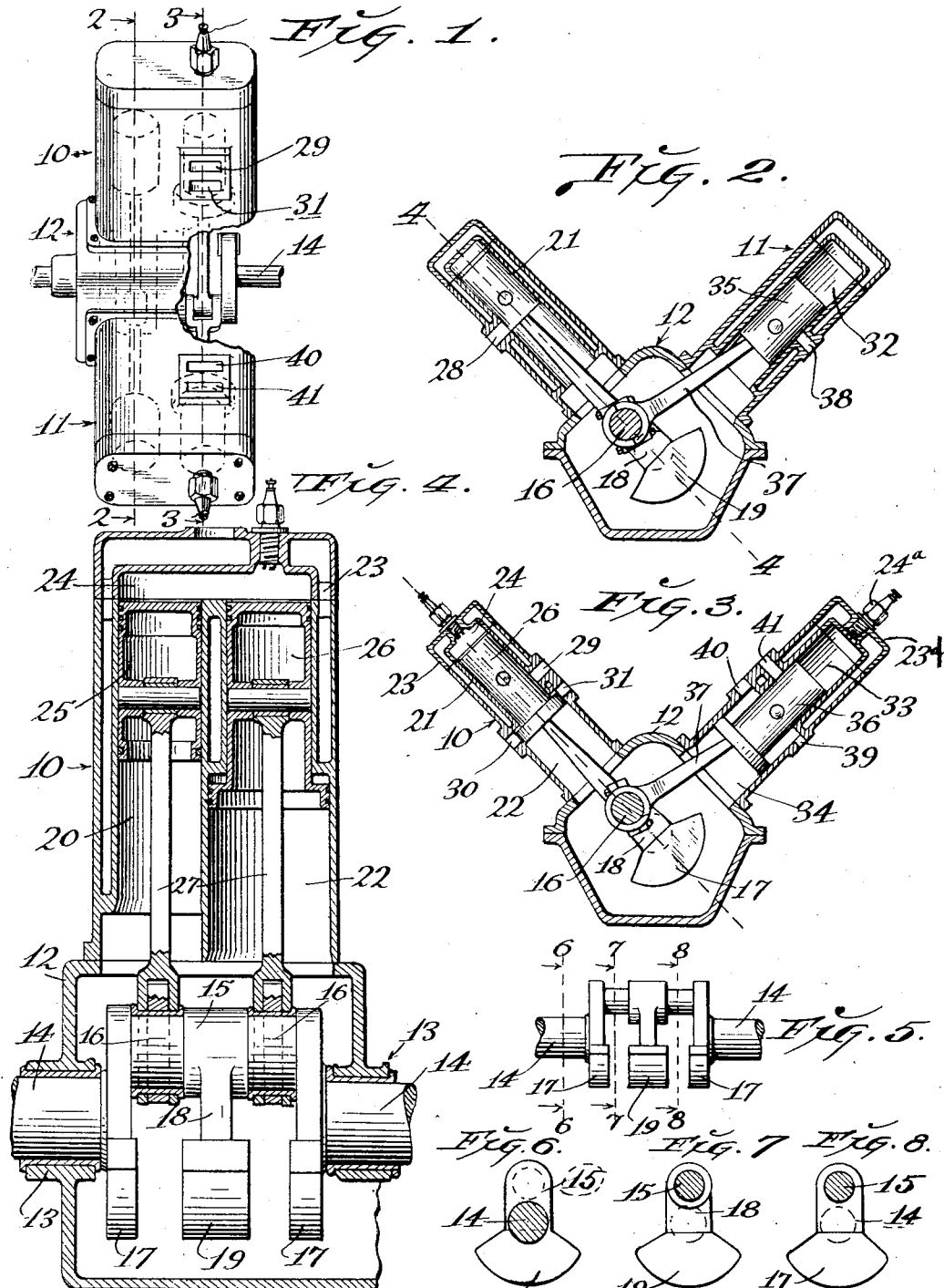
INVENTOR,
EVERETT R. BURTNETT.
By Martin O. Smith ATTY.

Patented July 9, 1929.

1,720,262

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

ENGINE.

Application filed June 18, 1925. Serial No. 37,993.

My invention relates to an engine wherein reciprocating pistons are connected to a crank shaft, the principal object of my invention being to provide in a multi-cylinder unit engine structure an arrangement of the cylinders, crank shaft and connections as will permit of complete balancing of the reciprocating parts as well as the rotary parts, thus enabling the engine to be operated at a maximum efficiency with an entire absence of vibration.

It is a recognized fact that a rotary out-of-balance weight is constant, and therefore the rotary mass, of which the out-of-balance portion is a part, can be put in balance by a counter weight arranged and applied so as to equally oppose the out-of-balance part and thus, the entire member becomes in rotary balance. However where reciprocating members such as pistons are attached by connecting rods to the crank pin of a crank shaft, the crank pin axis being eccentric relative to the axis of the crank shaft, develops a stroke of the attached reciprocating member as the crank shaft rotates.

It occurs that when the reciprocating member reaches either end of its stroke travel, the inertia of the reciprocating member is exerted as weight load on the crank pin, in the same direction that the reciprocating member has been moving for the instant preceding the time that it reaches the point of end center and in opposite direction to the direction in which the reciprocating member will be moved by the said crank pin, an instant after the point that the reciprocating mass has been fully accelerated in stroke speed by the crank or pressure (depending upon the condition and direction of stroke) and the passing of the crank pin axis through the arc of rotation.

In the half circle of revolution between the two points where the crank pin crosses the line that is parallel with the axis of the cylinder or parallel with the movement of the reciprocating member during its stroke, each crank and the reciprocating member attached to the crank move in one plane for a moment at practically the same speed. At this moment the reciprocating member has no appreciable weight load influence on the crank, in so far as inertia of the weight of itself is concerned and later for, as the crank shaft has revolved 90° from this point, the weight of the reciprocating member has an inertia weight pull on the crank pin through the connecting rod that is substantially equal the weight of the reciprocatory member.

Thus, it will be seen that twice during the revolution of the crank shaft, at the moment the crank pin changes its direction in relation to the axial line of the reciprocating members travel, that there will be the weight of the reciprocatory member added to the weight of the rotary mass about the axis of the crank pin, that the influence will be radial from the axis of the crank shaft, and, that twice during each revolution of the crank shaft at the moment the crank pin is 90° before or after the position it occupies when crossing the axial line of the reciprocating members stroke movement, there will be no weight added to the rotary mass about the axis of the crank pin by the reciprocatory member, as a consequence of the relatively parallel movement of the reciprocating and rotating crank pin for the moment.

Therefore, if a second reciprocating member is attached to the same crank pin by the duplicate of a connecting rod and the reciprocatory members weigh the same and are arranged 90° in relation to the other reciprocating member, then the weight added to the crank pin radially throughout its circle of revolution will be constant, for as one reciprocatory member accelerates to lower end center, the other will decelerate to upper end center thereby providing a constant weight influence at the crank pin which makes it possible to provide a counter weight to the rotary mass or crank shaft, that will diametrically oppose the radial weight influence at the crank pin.

Thus as the reciprocatory load influence at the crank pin is made constant, then a rotary counter weight that is constant, will establish a constant balance of reciprocatory and rotary members for the complete revolution.

Thus, it is the principal object of my invention, to provide for the combination of two reciprocating masses having their planes of reciprocation spaced 90° apart and radially centered so that the axis of the cylinders in which the reciprocating masses are contained, will intersect at the axis of the crank shaft and in order to develop the successful functioning and efficient operation of an engine having two cylinders to one function unit, I propose to attach the four pistons of two, two cylinder units, and where each pair of cylinders are spaced radially 90° apart, to one crank pin of a crank shaft.

With the foregoing and other objects in view, my invention consists in certain novel features of construction and arrangement of parts that will be hereinafter more fully described and claimed and illustrated in the accompanying drawing, in which Fig. 1 is a top plan view of an engine constructed in accordance with my invention.

Fig. 2 is a cross section taken on the line 2—2 of Fig. 1.

Fig. 3 is a cross section taken on the line 3—3 of Fig. 1.

Fig. 4 is an enlarged vertical section taken on the line 4—4 of Fig. 2.

Fig. 5 is an elevational view of the crank shaft used in my improved engine.

Fig. 6 is a cross section taken on the line 6—6 of Fig. 5.

Fig. 7 is a cross section taken on the line 7—7 of Fig. 5.

Fig. 8 is a cross section taken on the line 8—8 of Fig. 5.

Referring by numerals to the accompanying drawing, 10 and 11 designate cylinder blocks that are disposed to form a V-structure with their wings 90° apart and arranged at the lower ends of said wings is a crank case 12 having bearings 13 and a crank shaft 14. This crank shaft has a single crank pin 15 on which are formed two finished bearing surfaces 16 and both arms that extend from the shaft 14 to pin 15 are provided with counterbalancing weights 17 that are arranged diametrically opposite to said pin.

Projecting from the central portion of pin 15 and extending diametrically across the axis of the crank shaft and in line with the arms of the crank is an arm 18 carrying on its end a counterbalancing weight 19 that is in longitudinal alignment with weights 17.

Wing 10 is provided with a straight diameter bore 20 that functions as a combustion chamber and with a two-diameter bore chamber, the smaller portion 21 of which latter functions as a combustion chamber and the portion 22 of larger diameter functions as a charge volume pumping chamber. The axes of chamber 20 and the two-diameter chambers 21, 22, are parallel and they intersect the axis of crank shaft 14.

Arranged on the head end of block 10 is a head block 23 provided in its underside with a shallow recess 24 and which latter functions as a common compression and combustion clearance chamber for the head ends of the combustion chambers 20 and 21.

Arranged for operation within combustion chamber 20 is a piston 25 and a two-diameter piston 26 is arranged for operation within the two-diameter chambers 21, 22. Connecting rods such as 27 connect the pistons 25 and 26 to the two bearing peripheries 16 on crank pin 15. Formed through the wall that surrounds combustion chamber 20 is an exhaust port 28 that is located so that it is uncovered and open only when piston 25 is at the lower end of its travel.

Formed through the wall that incloses combustion chamber 21 is a charge volume inlet port 29 that is located so that it is uncovered and open only when the two-diameter piston 26 is at the lower end of its stroke.

Formed through the upper portion of the wall surrounding pumping chamber 22 is a charge volume inlet port 30, and a pumped charge volume outlet port 31.

Wing 11 is provided with a straight diameter bore combustion chamber 32 that is disposed transversely opposite to chamber 21, and said wing 11 is also provided with a two-diameter bore, the smaller portion 33 of which constitutes a combustion chamber and the larger diameter portion 34 of which constitutes a charge volume pumping chamber. This two-diameter bore is disposed transversely opposite to the two-diameter bore 21, 22, in wing 10.

Arranged for operation in combustion chamber 32 is a piston 35 and a two-diameter piston 36 is arranged for operation in the two-diameter chamber 33, 34. Pistons 35 and 36 are connected to the bearing peripheries 16 of crank 15 by connecting rods 37. Combustion chamber 32 is provided with an exhaust port 38 that is located so that it is uncovered and open only when piston 35 is at the lower end of its stroke. Formed in the upper portion of pumping chamber 34 is a charge volume inlet port 39 and a pumped charge volume outlet port 40.

A head block 23ª is secured on the head of block 11 and formed in the underside of said head block is a recess 24ª that connects and functions as a common compression and combustion clearance chamber for the combustion chambers 32 and 33.

Thus wing 11 is practically a duplicate of wing 10 and its equipment is the same.

Leading into the lower portion of combustion chamber 33 is a charge volume inlet port 41. Suitable transfer ducts (not shown) lead from outlet port 40 to inlet port 29 and from outlet port 31 to inlet port 41, and thus the charge volume from each pumping chamber is transferred to one of the combustion chambers in the opposite wing of the engine.

It will be understood that my improved engine operates on the two stroke cycle principle and thus as each pair of pistons approach and pass high center the gaseous fuel charge compressed in the corresponding one of the clearance chambers will be ignited and the consequent rise in pressure following combustion will be directed on the heads of the pistons to drive the same downward on their power stroke.

By arranging the two pairs of cylinders 90° apart and connecting the four pistons to the same throw of the crank shaft, and which throw is counterbalanced, I am able to effect a complete balancing of the reciprocating parts as well as the rotary parts and thereby establish constant balance for the complete revolution of the crank shaft, and which result is highly desirable in engine operation.

It will be understood that minor changes in the size, form and construction of the various parts of my improved engine may be made and substituted for those herein shown and described without departing from the spirit of my invention, the scope of which is set forth in the appended claim.

I claim as my invention:

In an engine, a power unit comprising four cylinders arranged to form a V-structure, the wings of which are 90° apart, each wing comprising two cylinders, one of which is provided with a straight diameter bore, the other cylinder being provided with a two diameter bore, the head ends of the two chambers in each wing being connected by a common clearance and combustion chamber, the larger diameter bore of each two diameter chamber being provided at its upper end with an inlet port and exhaust port, the smaller diameter portion of each two diameter bore being provided with an inlet port, pistons arranged for operation within the four chambers, a crank shaft having a single throw to which the four pistons are connected, a counterbalancing weight connected to the pin of the crank throw between the points that are engaged by the piston rods, said counterbalancing weight extending diametrically across the axis of the crank shaft and counterbalancing weights projecting diametrically opposite from the crank arms of said crank.

In testimony whereof I affix my signature.

EVERETT R. BURTNETT.